(12) United States Patent
Wang et al.

(10) Patent No.: US 8,279,690 B1
(45) Date of Patent: Oct. 2, 2012

(54) OPTIMAL CHANNEL DESIGN FOR MEMORY DEVICES FOR PROVIDING A HIGH-SPEED MEMORY INTERFACE

(75) Inventors: Min Wang, Santa Clara, CA (US); Philip Arnold Ferolito, Sunnyvale, CA (US); Suresh Natarajan Rajan, San Jose, CA (US); Michael John Sebastian Smith, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/367,259

(22) Filed: Feb. 6, 2012

Related U.S. Application Data

(62) Division of application No. 11/941,589, filed on Nov. 16, 2007, now Pat. No. 8,111,566.

(51) Int. Cl.
*G11C 7/00* (2006.01)
(52) U.S. Cl. ............. 365/198; 365/191; 365/51; 365/63
(58) Field of Classification Search ..................... 365/72, 365/63, 51, 198, 191
See application file for complete search history.

(56) References Cited

U.S. PATENT DOCUMENTS

| | | | |
|---|---|---|---|
| 5,369,749 A | 11/1994 | Baker et al. | |
| 6,065,092 A | 5/2000 | Roy | |
| 6,181,640 B1 | 1/2001 | Kang | |
| 6,226,730 B1 | 5/2001 | Murdoch et al. | |
| 6,628,538 B2 | 9/2003 | Funaba et al. | |
| 7,138,823 B2 | 11/2006 | Janzen et al. | |
| 7,337,293 B2 | 2/2008 | Brittain et al. | |
| 7,934,070 B2 | 4/2011 | Brittain et al. | |
| 7,990,797 B2 | 8/2011 | Moshayedi et al. | |
| 8,111,566 B1 * | 2/2012 | Wang et al. ................... | 365/198 |
| 2002/0060948 A1 | 5/2002 | Chang et al. | |
| 2003/0088743 A1 | 5/2003 | Rader | |
| 2004/0042503 A1 | 3/2004 | Shaeffer et al. | |
| 2005/0086548 A1 | 4/2005 | Haid et al. | |
| 2005/0139977 A1 | 6/2005 | Nishio et al. | |
| 2005/0286334 A1 | 12/2005 | Saito et al. | |
| 2006/0179262 A1 | 8/2006 | Brittain et al. | |
| 2008/0126624 A1 | 5/2008 | Prete et al. | |
| 2008/0215832 A1 | 9/2008 | Allen et al. | |
| 2008/0256282 A1 | 10/2008 | Guo et al. | |

FOREIGN PATENT DOCUMENTS

| | | |
|---|---|---|
| WO | WO00/45270 | 8/2001 |
| WO | WO2004/051645 | 6/2004 |

OTHER PUBLICATIONS

Non-Final Office Action from U.S. Appl. No. 11/858,518, Dated Sep. 27, 2011.
Notice of Allowance from U.S. Appl. No. 11/929,571, Dated Sep. 27, 2011.

(Continued)

*Primary Examiner* — Andrew Q Tran
(74) *Attorney, Agent, or Firm* — Fish & Richardson P.C.

(57) ABSTRACT

A system is provided for high-speed communication between a memory controller and a plurality of memory devices. A memory controller, and a plurality of memory devices are provided. Additionally, at least one channel is included for providing electrical communication between the memory controller and the plurality of memory devices, an impedance of the channel being at least partially controlled using High Density Interconnect (HDI) technology.

17 Claims, 10 Drawing Sheets

OTHER PUBLICATIONS

Notice of Allowance from U.S. Appl. No. 11/929,500, Dated Sep. 27, 2011.
Notice of Allowance from U.S. Appl. No. 11/941,589, Dated Sep. 30, 2011.
Notice of Allowance from U.S. Appl.No. 12/816,756, Dated Oct. 3, 2011.
Non-Final Office Action from U.S. Appl. No. 12/508,496, Dated Oct. 11, 2011.
Non-Final Office Action from U.S. Appl. No. 11/588,739, Dated Oct. 13, 2011.
Notice of Allowance from U.S. Appl. No. 11/939,432, Dated Oct. 24, 2011.
Non-Final Office Action from U.S. Appl. No. 11/929,631, Dated Nov. 1, 2011.
Non-Final Office Action from U.S. Appl. No. 11/553,372, Dated Nov. 14, 2011.
Notice of Allowance from U.S. Appl. No. 11/515,223, Dated Nov. 29, 2011.
Notice of Allowance from U.S. Appl. No. 12/769,428, Dated Nov. 28, 2011.
Final Office Action from U.S. Appl. No. 11/939,440, Dated Dec. 12, 2011.
Notice of Allowance from U.S. Appl. No. 12/797,557, Dated Dec. 28, 2011.
Office Action, including English translation, from co-pending Japanese application No. 2008-529353, Dated Jan. 10, 2012.
Notice of Allowance from U.S. Appl. No. 12/838,896, Dated Jan. 18, 2012.
Final Office Action from U.S. Appl. No. 11/929,655, Dated Jan. 19, 2012.
Final Office Action from U.S. Appl. No. 12/378,328, Dated Feb. 3, 2012.
Final Office Action from U.S. Appl. No. 11/672,921, Dated Feb. 16, 2012.
Final Office Action from U.S. Appl. No. 11/672,924, Dated Feb. 16, 2012.
Final Office Action from U.S. Appl. No. 11/929,225, Dated Feb. 16, 2012.
International Search Report for Application No. EP12150807, Dated Feb. 16, 2012.
Final Office Action from U.S. Appl. No. 11/828,181, Dated Feb. 23, 2012.
Non-Final Office Action from U.S. Appl. No. 11/461,520, Dated Feb. 29, 2012.
Notice of Allowance from U.S. Appl. No. 12/574,628, Dated Mar. 6, 2012.
Non-Final Office Action from U.S. Appl. No. 13/276,212, Dated Mar. 15, 2012.
Non-Final Office Action from U.S. Appl. No. 13/343,612, Dated Mar. 29, 2012.
Notice of Allowance from U.S. Appl. No. 11/939,440, Dated Mar. 30, 2012.
European Search Report from co-pending European application No. 11194876.6-2212/2450798, Dated Apr. 12, 2012.
European Search Report from co-pending European application No. 11194862.6-2212/2450800, Dated Apr. 12, 2012.
Notice of Allowance from U.S. Appl. No. 11/929,636, Dated Apr. 17, 2012.
Final Office Action from U.S. Appl. No. 11/858,518, Dated Apr. 17, 2012.
European Search Report from co-pending European application No. 11194883.2-2212, Dated Apr. 27, 2012.
Non-Final Office Action from U.S. Appl. No. 11/553,372, Dated May 3, 2012.
Notice of Allowance from U.S. Appl. No. 11/929,631, Dated May 3, 2012.
Non-Final Office Action from U.S. Appl. No. 13/165,713, Dated May 22, 2012.
Non-Final Office Action from U.S. Appl. No. 12/144,396, Dated May 29, 2012.
Non-Final Office Action from U.S. Appl. No. 13/165,713, Dated May 31, 2012.
Non-Final Office Action from U.S. Appl. No. 13/280,251, Dated Jun. 12, 2012.
Final Office Action from U.S. Appl. No. 11/855,805, Dated Jun. 14, 2012.

* cited by examiner

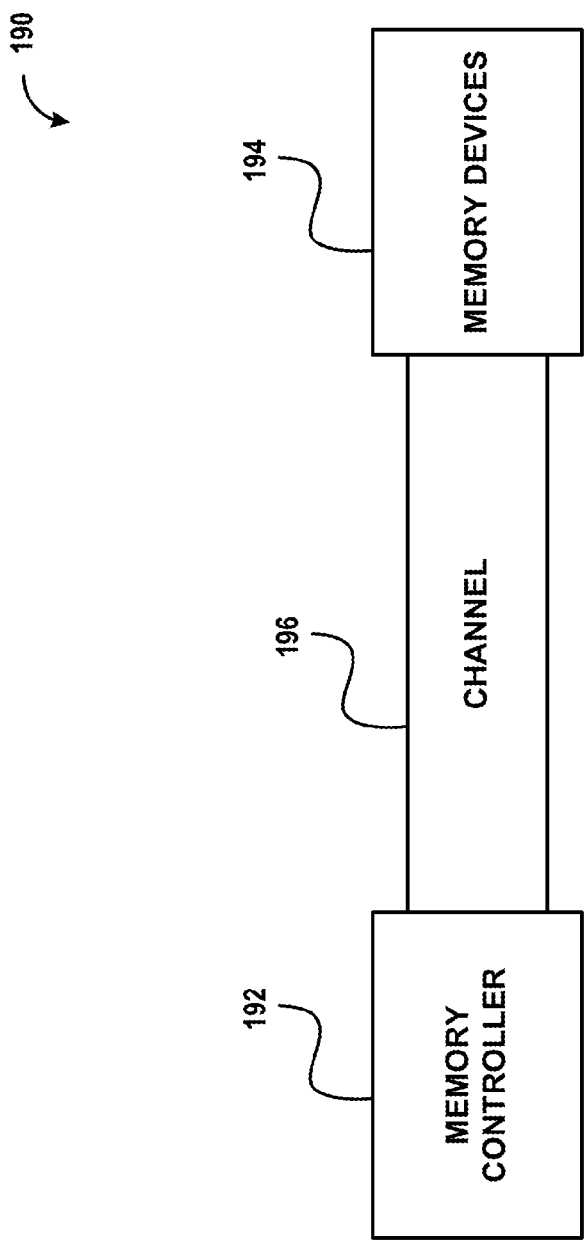

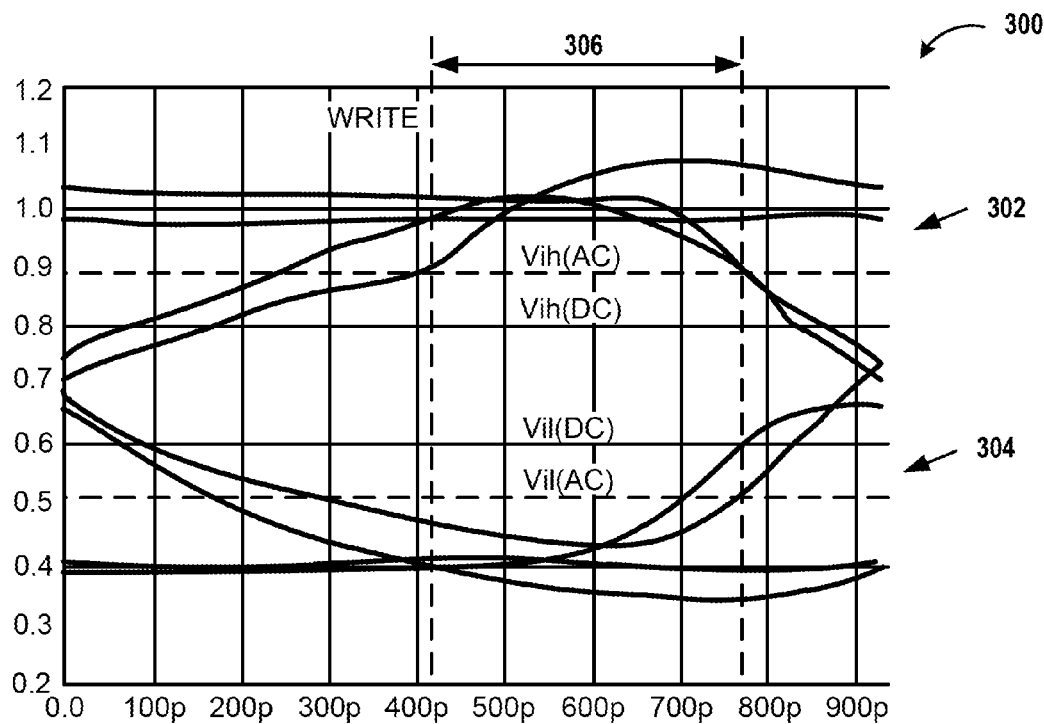
FIGURE 3A
(PRIOR ART)
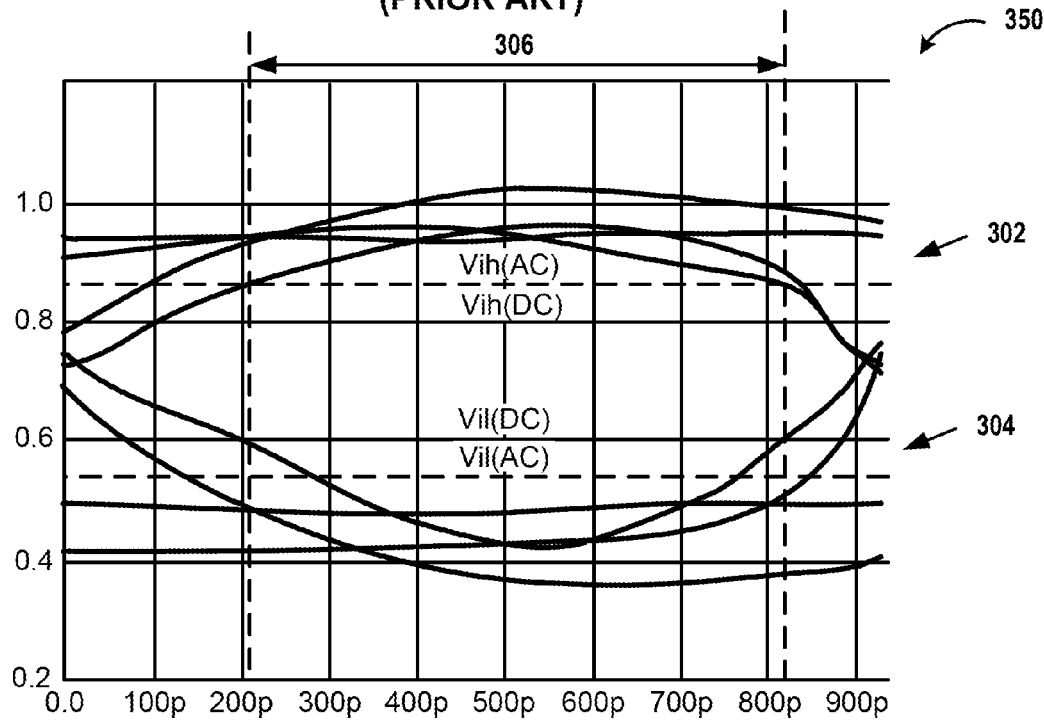
FIGUER 3B

OPTIMAL CHANNEL DESIGN FOR MEMORY DEVICES FOR PROVIDING A HIGH-SPEED MEMORY INTERFACE

CROSS-REFERENCE TO RELATED APPLICATIONS

This application is a divisional of and claims the benefit of the filing date of prior U.S. application Ser. No. 11/941,589, filed Nov. 16, 2007. The contents of the prior application is incorporated herein by reference in its entirety.

FIELD OF THE INVENTION

The present invention relates to circuit boards, and more particularly to providing communication between a memory controller and memory devices.

BACKGROUND

There is an ever-increasing desire for faster and more compact semiconductor memory with an increasing amount of functionality. One challenge in the design of memory subsystems involves utilizing readily available manufacturing techniques and materials. In many cases, a memory subsystem designer may have limited control of some of the components of the system, or as is sometimes the case in memory subsystems, many components of the memory subsystem are defined by actual or de-facto standards. Extreme economic demands are placed on the memory subsystem designer to find techniques to improve the speed and capacity of the subsystem while maintaining high reliability standards, low cost, and small form factor.

Commercial embodiments of memory systems often contain a memory controller, package and PCB interconnects, and at least one dual in-line memory module (DIMM). Often, the topology of the electrical connectivity between a memory controller and one or more DIMMs is characterized by different interconnect distances between the memory controller and DIMM #1, DIMM #2, DIMM#3, etc. Such a configuration is known as a multi-drop bus topology.

A structure of transmission conductor, dielectric substrate material, and conductive reference plane is often referred to as a transmission line, for carrying signals. A group of transmission lines connecting multiple chips are usually called a channel. The transmission channel has higher transmission bandwidth if its impedance profile is better matched along the channel. As DIMMs are added to the multi-drop configuration, additional capacitive loads as well as additional impedance discontinuity points are presented in the transmission channel, which in turn may have the effect to decrease the maximum speed of communication through the channel.

Capacitive loading limits the maximum channel bandwidth. Additionally, impedance discontinuity of the channel exhibits the inherently undesirable phenomenon of multiple reflections and resonance, both of which phenomenon tend to decrease the maximum speed of communication through the channel. There is thus a need for addressing these and/or other issues associated with the prior art.

SUMMARY

A system is provided for high-speed communication between a memory controller and a plurality of memory devices. A memory controller, and a plurality of memory devices are provided. Additionally, at least one channel is included for providing electrical communication between the memory controller and the plurality of memory devices, an impedance of the channel being at least partially controlled using High Density Interconnect (HDI) technology.

BRIEF DESCRIPTION OF THE DRAWINGS

FIG. 1A shows a system for providing electrical communication between a memory controller and a plurality of memory devices, in accordance with one embodiment.

FIG. 3A shows an eye diagram of a data write cycle associated with the prior art.

FIG. 3B shows an eye diagram of a data write cycle, in accordance with one embodiment.

DETAILED DESCRIPTION

Figure 1B:
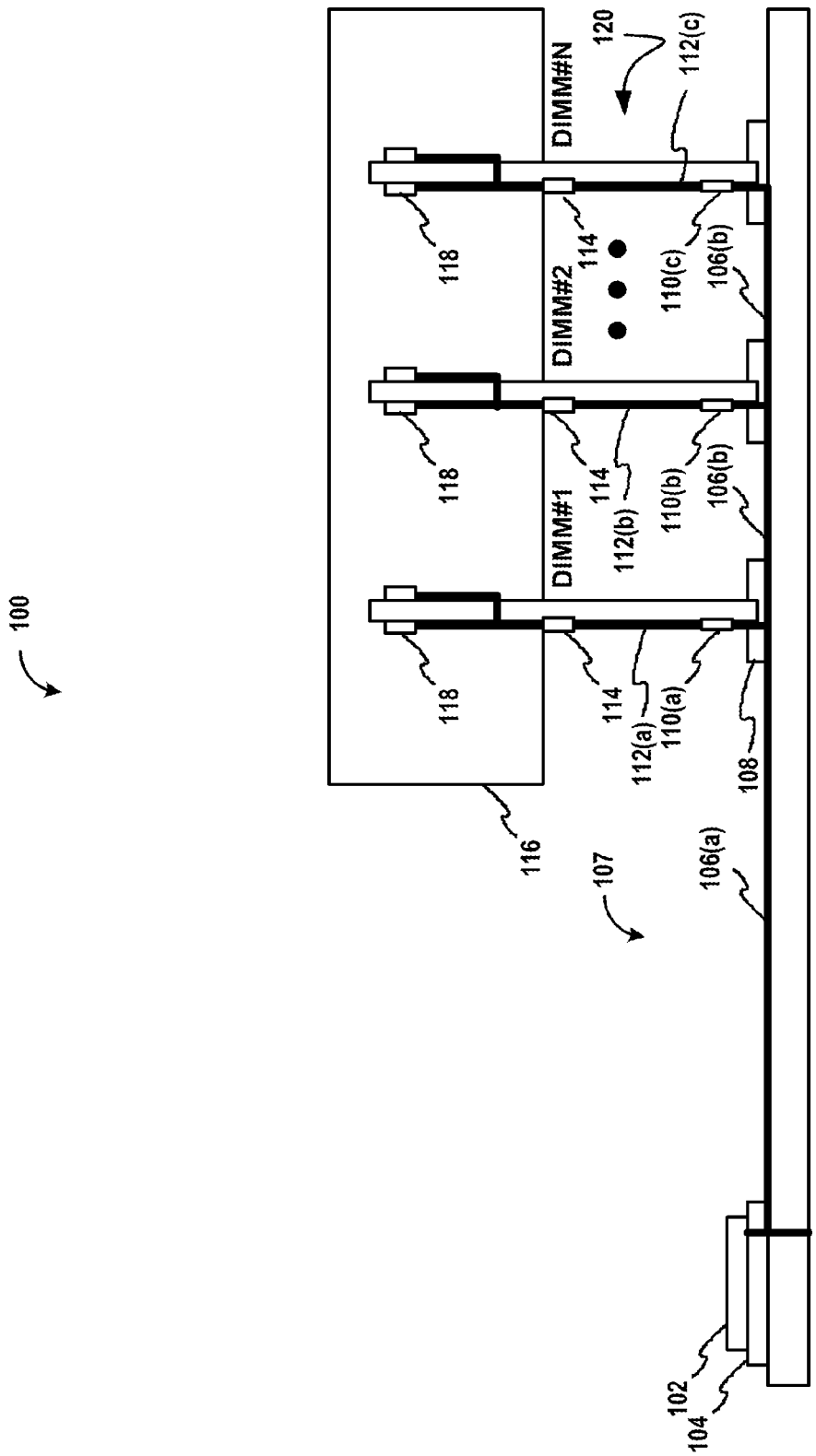
FIG. 1B shows a system for providing electrical communication between a host controller chip package and one or more memory devices.

FIG. 1A shows a system 190 for providing electrical communication between a memory controller and a plurality of memory devices, in accordance with one embodiment. As shown, a memory controller 192 is provided. Additionally, a plurality of memory devices 194 are provided. Still yet, a channel 196 is included for providing electrical communication between the memory controller 192 and the plurality of memory devices 196, an impedance of the channel being at least partially controlled using High Density Interconnect (HDI) technology. In the context of the present description, HDI refers to a technology utilized to condense integrated circuit packaging and printed circuit boards (PCBs) in order to obtain higher electrical performance, higher scale of integration, and more design convenience.

Additionally, in the context of the present description, a channel refers to any component, connection, or group of components and/or connections, used to provide electrical communication between a memory device and a memory controller. For example, in various embodiments, the channel 196 may include PCB transmission lines, module connectors, component packages, sockets, and/or any other components or connections that fit the above definition. Furthermore, the memory devices 194 may include any type of memory device. For example, in one embodiment, the memory devices 194 may include dynamic random access memory (DRAM). Additionally, the memory controller 192 may be any device capable of sending instructions or commands, or otherwise controlling the memory devices 194.

In one embodiment, the channel 196 may be connected to a plurality of DIMMs. In this case, at least one of the DIMMs may include a micro-via. In the context of the present description, a micro-via refers to a via constructed utilizing mico-via technology. A via refers to any pad or strip with a plated hole that connects tracks from one layer of a substrate (e.g. a PCB) to another layer or layers.

In another embodiment, at least one of the DIMMs may include a microstrip trace constructed on a board using HDI technology. In this case, a microstrip refers to any electrical transmission line on the surface layer of a PCB which can be used to convey electrical signals. As an option, the DIMMs may include a read and/or write path. In this case, impedance controlling may be utilized to adjust signal integrity properties of the read and/or write communication path. In one embodiment, the impedance controlling may use HDI technology. In the context of the present description, impedance controlling refers to any altering or configuring of the impedance of a component.

As an option, at least one interface circuit (not shown) may also be provided for allowing electrical communication between the memory controller 192 and at least one of the memory devices 194, where the interface circuit may be utilized as an intermediate buffer or repeater chip between the memory controller 192 and at least one memory device 194. In this case, the interface circuit may be included as part of a DIMM. In one embodiment, the interface circuit may be electronically positioned between the memory controller 192 and at least one of the plurality of memory devices 194. In this case, signals from the memory controller 192 to the memory devices 194 will pass though the interface circuit.

As an option, the interface circuit may include at least one programmable I/O driver. In such case, the programmable I/O driver may be utilized to buffer the signals from memory controller 192, recover the signal waveform quality, and resend them to at least one downstream memory device 194.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 1B shows a system 100 for providing electrical communication between a host controller chip package 102 and one or more memory devices 118. The electrical signals traverse paths from the host controller chip package 102 through a socket 104, traces 106(a)-106(b) on the surface of a printed circuit board (PCB) 107, through a DIMM connector 108, a resistor stub (Rstub) 110(a)-110(c), traces 112(a)-112(b) on the surface of the DIMMs 120, any other interface connectors or circuits 114, and finally to one or more memory devices 118 (e.g. DRAM, etc.).

As shown further, a plurality of DIMMs 120 may be provided (e.g. DIMM#1-DIMM#N). Any number of DIMMs 120 may be included. In such a configuration, the topology of the communication between the host controller chip package 102 and the memory devices 118 is called a multi-drop topology.

Figure 1C:
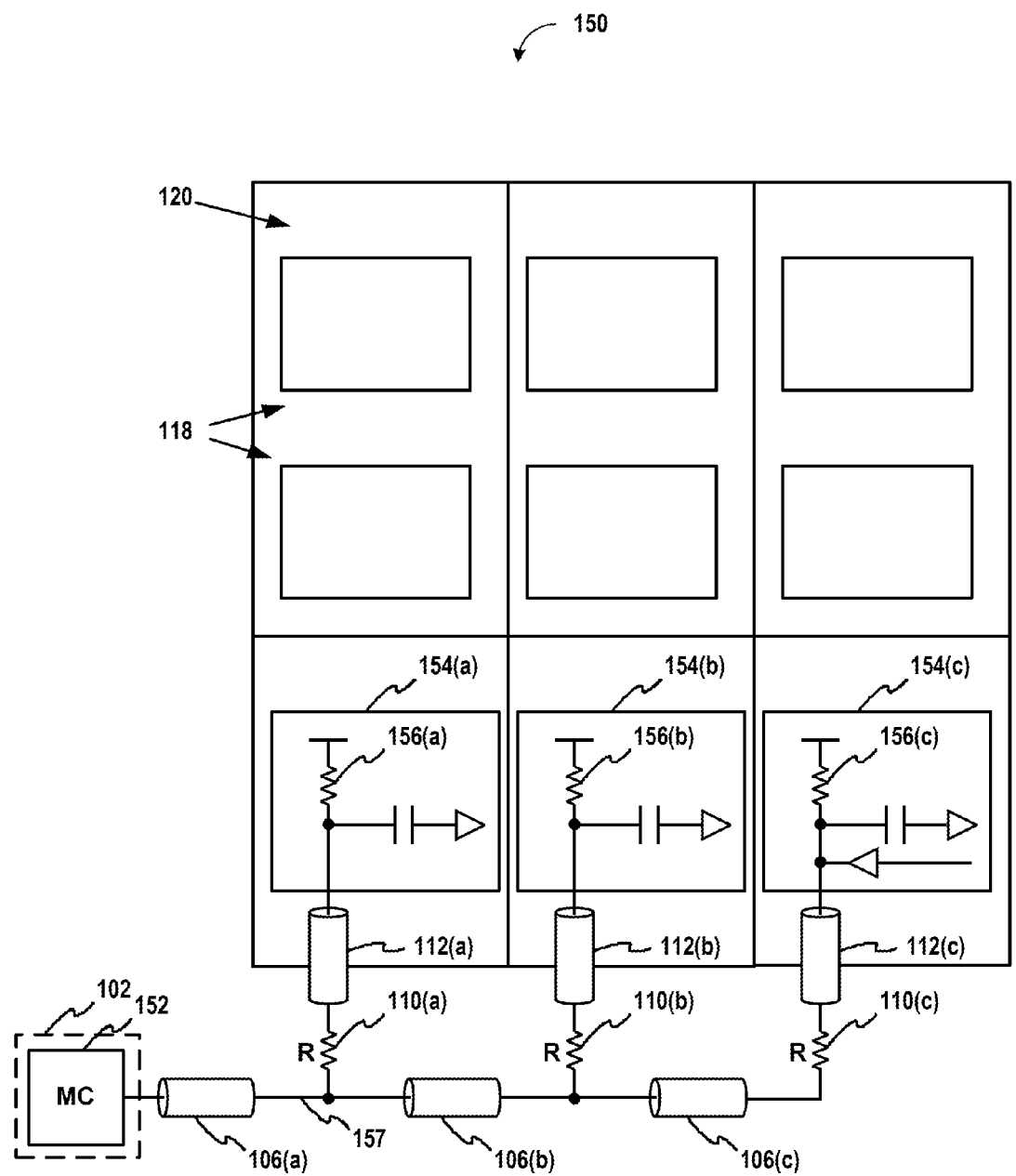
FIG. 1C illustrates a system corresponding to a schematic representation of the topology and interconnects for FIG. 1B.

FIG. 1C illustrates a system 150 corresponding to a schematic representation of the topology and interconnects for FIG. 1B. As shown in FIG. 1C, a memory controller 152 which may be part of the host controller chip package 102 is connected to a buffer chip 154(a) through traces (e.g. transmission lines) 106(a) and 112(a). Similarly, the memory controller 152 is connected to a buffer chip 154(b) through traces 106(a), 106(b), and 112(b). As shown further, the memory controller 152 is connected to a buffer chip 154(c) through traces 106(a)-106(c), and 112(c). Together, the traces form a channel such that the memory controller 152 may maintain electrical communication with the plurality of memory devices 118.

It should be noted that, in various embodiments the system 150 may include a motherboard (e.g. the PCB 107), multiple connectors, multiple resistor stubs, multiple DIMMs, multiple arrays of memory devices, and multiple interface circuits, etc. Further, each buffer chips 154(a)-154(c) may be situated electrically between the memory controller 152 and corresponding memory devices 118, as shown.

It should also be noted that the system 150 may be constructed from components with various characteristics. In one embodiment, the system 150 may be constructed such that the traces 106(a)-106(c) may present an impedance (presented at point 157) of about 50 ohms to about 55 ohms. In one exemplary embodiment, the impedance of the traces 106(a)-106(c) may be 52.5 ohms.

In this case, for the data read/write channel, the resistive stubs 110(a)-110(c) may be configured to have a resistance of about 8 ohms to about 12 ohms. In one exemplary embodiment, the resistive stubs 110(a)-110(c) may have a resistance of 10 ohms. Additionally, the DIMMs 120 may have an impedance of about 35 ohms to about 45 ohms at a point of the traces 112(a)-112(c). In one exemplary embodiment, the DIMMs 120 may have an impedance of 40 ohms. In addition, the on-die termination resistors 156(a)-156(c) may be configured have a resistance of 20 Ohm, 20 Ohm, and off respectively, if buffer chip 154(c) is the active memory device in the operation. In the prior art, for example, the resistive stubs 110(a)-110(c) may be configured as 15 Ohm and the DIMMs 120 are configured as 68 Ohm.

In this case, for the command/address channel, the resistive stubs 110(a)-110(c) may be configured to have a resistance of about 20 ohms to about 24 ohms, in one exemplary embodiment, the resistive stubs 110(a)-110(c) may have a resistance of 22 ohms. In this case, the impedance of traces 112(a)-112(c) may be about 81 ohms to about 99 ohms. In one exemplary embodiment, the impedance of the traces 112(a)-112(b) may be 90 ohms. In addition, the on-die termination resistors (input bus termination, IBT) 156(a)-156(c) may be configured have a resistance of 100 Ohm, 100 Ohm, 100 Ohm, respectively. In the prior art, for example, the resistive stubs 110(a)-110(c) are configured as 22 Ohm and the DIMMs 120 are configured as 68 Ohm. It should be noted, that all of the forgoing impedances are specific examples, and should not be construed as limiting in any manner. Such impedances may vary depending on the particular implementation and components used.

In order to realize a physical design with the characteristics as mentioned in the preceding paragraphs, several physical design techniques may be employed. For example, in order to achieve a desired impedance at a point of the traces 112(a)-112(b), a PCB manufacturing technique known as High Density Interconnect (HDI), and Build-Up technology may be employed.

HDI technology is a technique to condense integrated circuit packaging for increased microsystem density and high performance. HDI technology is sometimes used as a generic term to denote a range of technologies that may be added to normal PCB technology to increase the density of interconnect. HDI packaging minimizes the size and weight of the electronics while maximizing performance. HDI allows three-dimensional wafer-scale packaging of integrated circuits. In context of the present description the particular features of HDI technology that are used are the thin layers used as insulating material between conducting layers and micro-via holes that connect conducting layers and are drilled through the thin insulating layers.

One way of constructing the thin insulating layers is using build-up technology, although other methods may equally be employed. One way of creating micro-vias is to use a laser to drill a precision hole through thin build-up layers, although other methods may equally be employed. By using a laser to direct-write patterns of interconnect layouts and drill micro-via holes, individual chips may be connected to each other using standard semiconductor fabrication methods. The thin insulating layers and micro-vias provided by HDI technology allow precise control over the transmission line impedance of the PCB interconnect as well as the unwanted parasitic impedances of the PCB interconnect.

In another embodiment, a micro-via manufacturing technique may be utilized to achieve the desired impedance at a point of the traces 112(a)-112(c). Micro-via technology implements a via between layers of a PCB wherein the via traverses only between the specific two layers of the PCB, resulting in elimination of redundant open via stubs with conventional through-hole vias, a much lower parasitic capacitance, a much smaller impedance discontinuity and accordingly a much lower amplitude of reflections. In the context of the present description, a via refers to any pad or strip with a plated hole that connects tracks from one layer of a substrate (e.g. a PCB) to another layer or layers.

Additionally, in order to achieve better electrical signal performance, a PCB manufacturing technique known as flip-chip may be employed. Flip chip package technology implements signal connectivity between the package and a die that uses much less (and often a shortened run-length of) conductive material than other similarly purposed technologies employed for the stated connectivity such as wire bond, and therefore presents a much lower serial inductance, and accordingly a much lower impedance discontinuity and lower inductive crosstalk.

To further extend the read cycle signal integrity between the memory controller 152 and the memory devices 118, a programmable I/O driver may be employed. In this case, the driver may be capable of presenting a range of drive strengths (e.g. drive strengths 1-N, where N is an integer). Each of the drive strength settings normally corresponds to a different value of effective or average driver resistance or impedance, though other factors such as shape, effective resistance, etc. of the drive curve at different voltage levels may also be varied. Such a strength value may be programmed using a variety of well known techniques, including setting the strength of the programmable buffer as a response to a command originating or sent through the memory controller 152. Due to the nature of the multi-drop topology, the read path desires stronger driver strength than what memory devices on regular Register-DIMM can provide.

The components that contribute to the characteristics of the aforementioned channel are designed to provide an interconnection capable of conveying high-speed signal transitions. Table 1 shows specific memory cycles (namely, READ, WRITE, and CMD) illustrating the performance characteristics of a generic solution of the prior art, representative of commercial standards, versus an implementation of one embodiment discussed in the context of the present description. It should be noted that long valid data times (e.g. valid windows) supporting high frequency memory reads and writes are both highly valued, and ehusive.

TABLE 1

| Path | Generic Embodiments | | Presently Discussed Embodiments | |
| --- | --- | --- | --- | --- |
| | Impedance Matching | Valid Window | Impedance Matching | Valid Window |
| READ | ~70 ohm driving into 40 ohm in parallel with 40 ohm | 300 picoseconds | ~40 ohm driving into 40 ohm in parallel with 40 ohm | 700 picoseconds |
| WRITE | ~40 ohms driving into 80 in parallel with 40 | 280 picoseconds | ~40 ohm driving into 50 ohm in parallel with 40 ohm | 580 picoseconds |
| CMD | | 630 picoseconds | | 1 nanosecond |

As shown in Table 1, impedance matching of the presently discussed embodiments are nearly symmetric. This is in stark contrast to the extreme asymmetric nature of the prior art. In the context of the present description, impedance matching refers to configuring the impedances of different transmission line segments in a channel so that the impedance variation along the channel remains minimal. There are challenges for achieving good impedance match on both read and write directions for a multi-drop channel topology. Additionally, not only the differences in symmetry between the READ and WRITE paths that are evident, but also the related characteristics as depicted in FIGS. 2-4 discussed below.

Figure 2A:
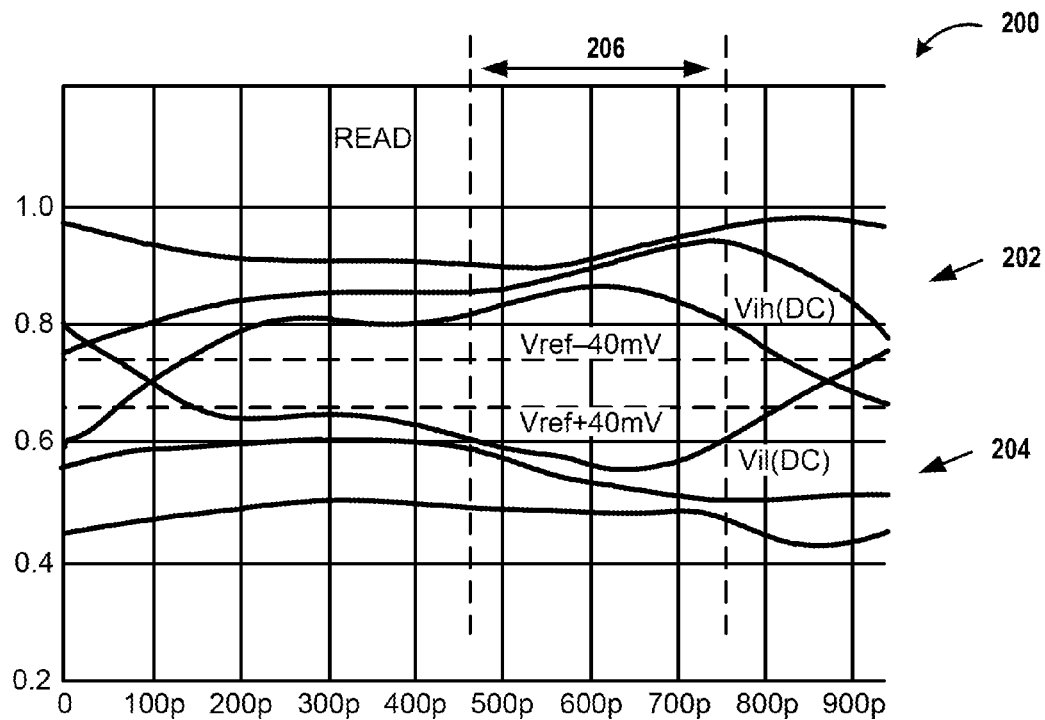
FIG. 2A shows an eye diagram of a data read cycle associated with the prior art.
Figure 2B:
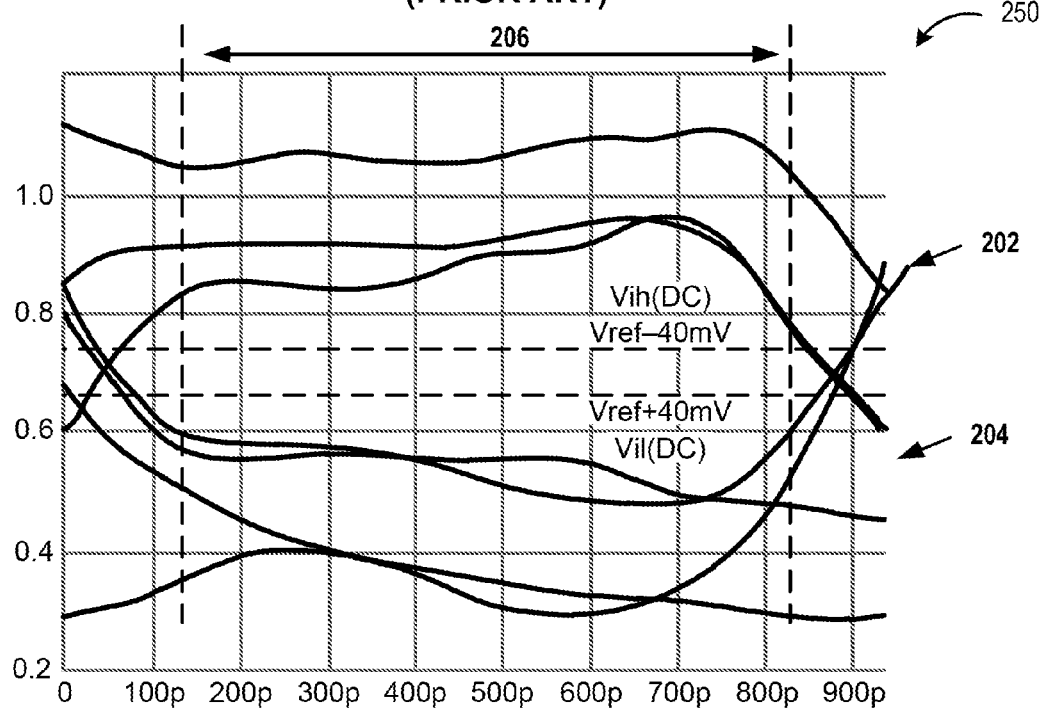
FIG. 2B shows an eye diagram of a data read cycle, in accordance with one embodiment.

FIGS. 2A and 2B depict eye diagrams 200 and 250 for a data READ cycle for double-data-rate three (DDR3) dual rank synchronous dynamic random access memory (SDRAM) at a speed of 1067 Mbps. FIG. 2A substantially illustrates the data shown for the generic READ memory cycle associated with the prior art. In particular, FIG. 2A shows a time that an eye is almost closed.

More specifically the time that high signals 202 is above the high DC input threshold Vih(DC) voltage and the time that the low signals 204 are below the lower DC input threshold Vil(DC) voltage defines a valid window 206 (i.e. the eye). As can be seen by inspection, the valid window 206 of FIG. 2A is only about 300 picoseconds, while the valid window 206 of an implementation of the presently discussed embodiments is about 700 picoseconds, as shown in FIG. 2B, which is more than twice as long as the prior art.

In similar fashion, FIGS. 3A and 3B depict eye diagrams 300 and 350 for a data WRITE cycle. Inspection of FIG. 3A illustrates data for the WRITE cycle associated with the prior art. More specifically, the time that high signals 302 are above the Vih(AC) voltage and the time that low signals 304 are below the Vil(DC) voltage defines a valid window 306. As can be seen by inspection, the valid window of FIG. 3A is only about 350 picoseconds, while the valid window 306 of an implementation of the presently discussed embodiments is about 610 picoseconds, as shown in FIG. 3B.

Figure 4A:
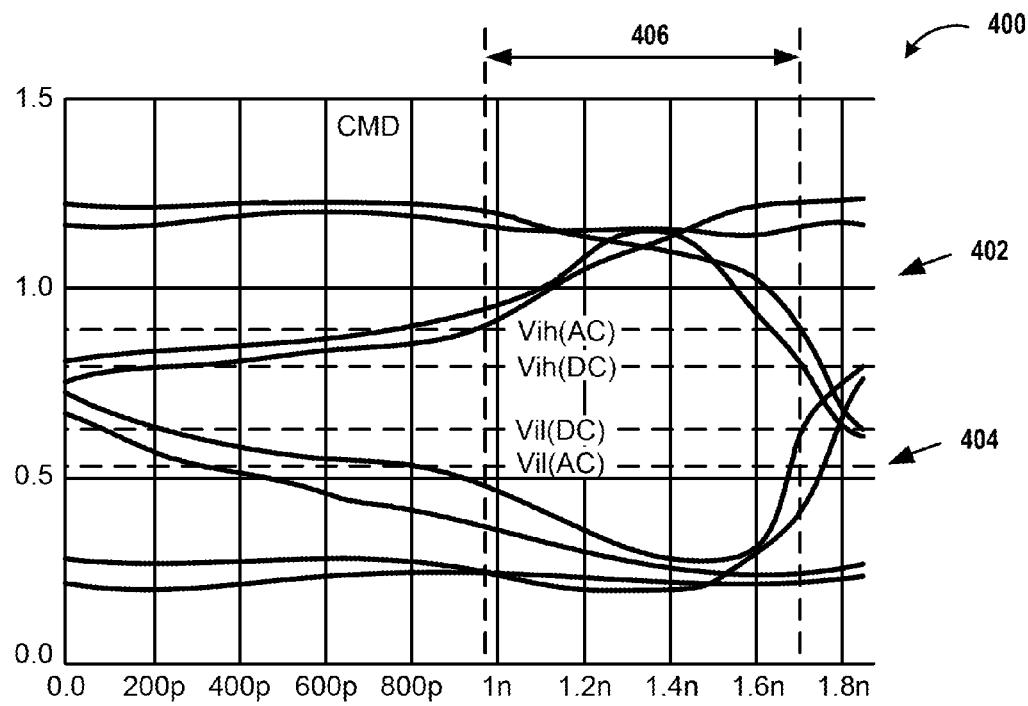
FIG. 4A shows an eye diagram of a command/address (CMD/ADDR) cycle associated with the prior art.
Figure 4B:
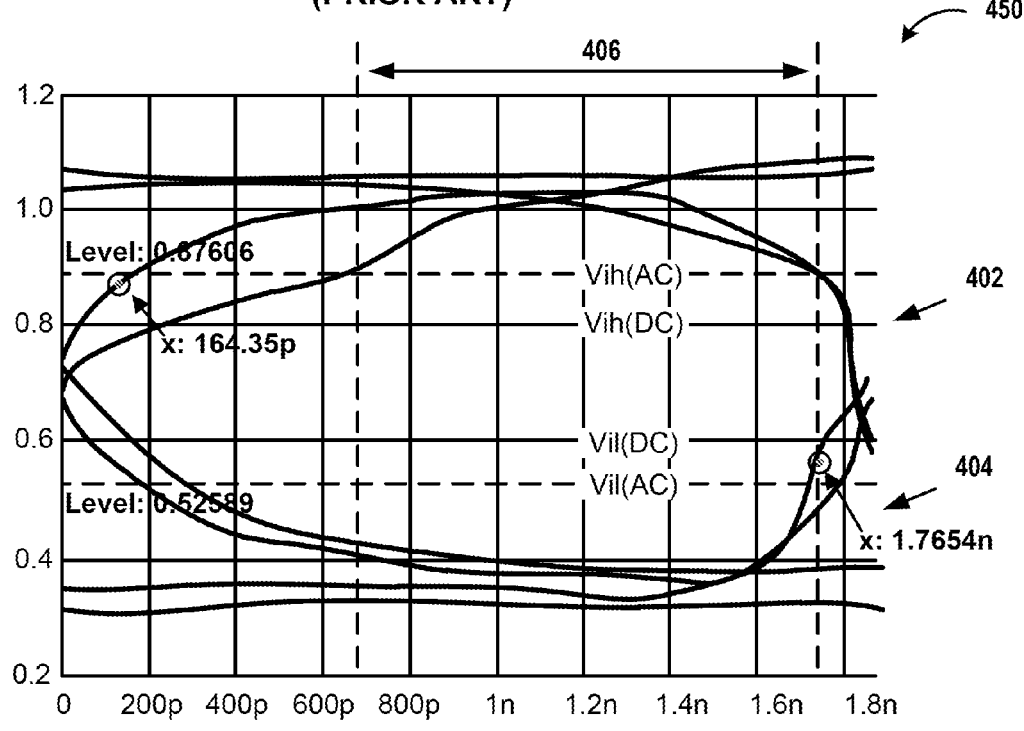
FIG. 4B shows an eye diagram of a CMD/ADDR cycle, in accordance with one embodiment.

FIGS. 4A and 4B depict eye diagrams 400 and 450 for a CMD cycle. Inspection of FIG. 4A illustrates data for the CMD cycle associated with the prior art. More specifically a time that high signals 402 is above the Vih(AC) voltage and a time that low signals 404 are below the Vil(DC) voltage defines the valid window 406. As can be seen by inspection, the valid window 406 of FIG. 4A is only about 700 picoseconds, while the valid window 406 of the presently discussed embodiments as shown in FIG. 4B is about 1.05 nanoseconds.

Figure 5A:
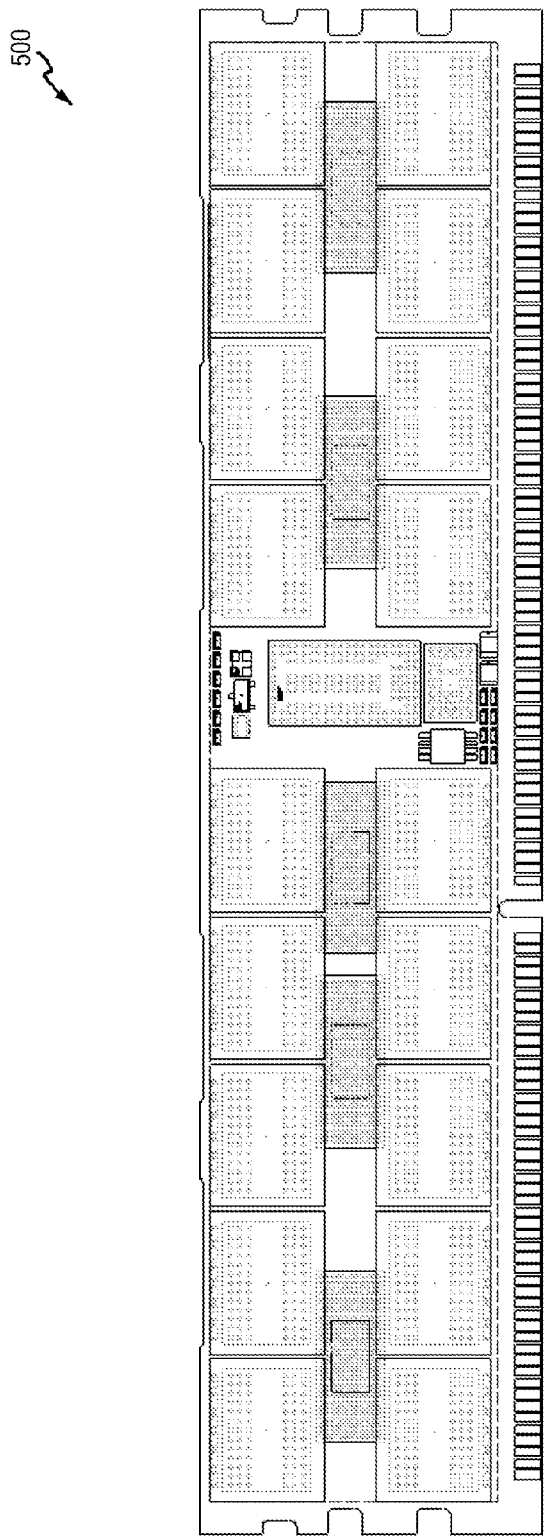
FIGS. 5A and 5B depict a memory module (e.g. a DIMM) and a corresponding buffer chip, in accordance with one embodiment.
Figure 5B:
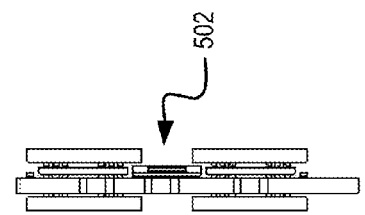

FIGS. 5A and 5B depict a memory module (e.g. a DIMM) 500 and a corresponding buffer chip 502 which may be utilized in the context of the details of the FIGS. 1-4. For example, the memory module 500 and the buffer chip 502 may be utilized in the context of the DIMMs 120 of FIGS. 1B and 1C.

Figure 6:
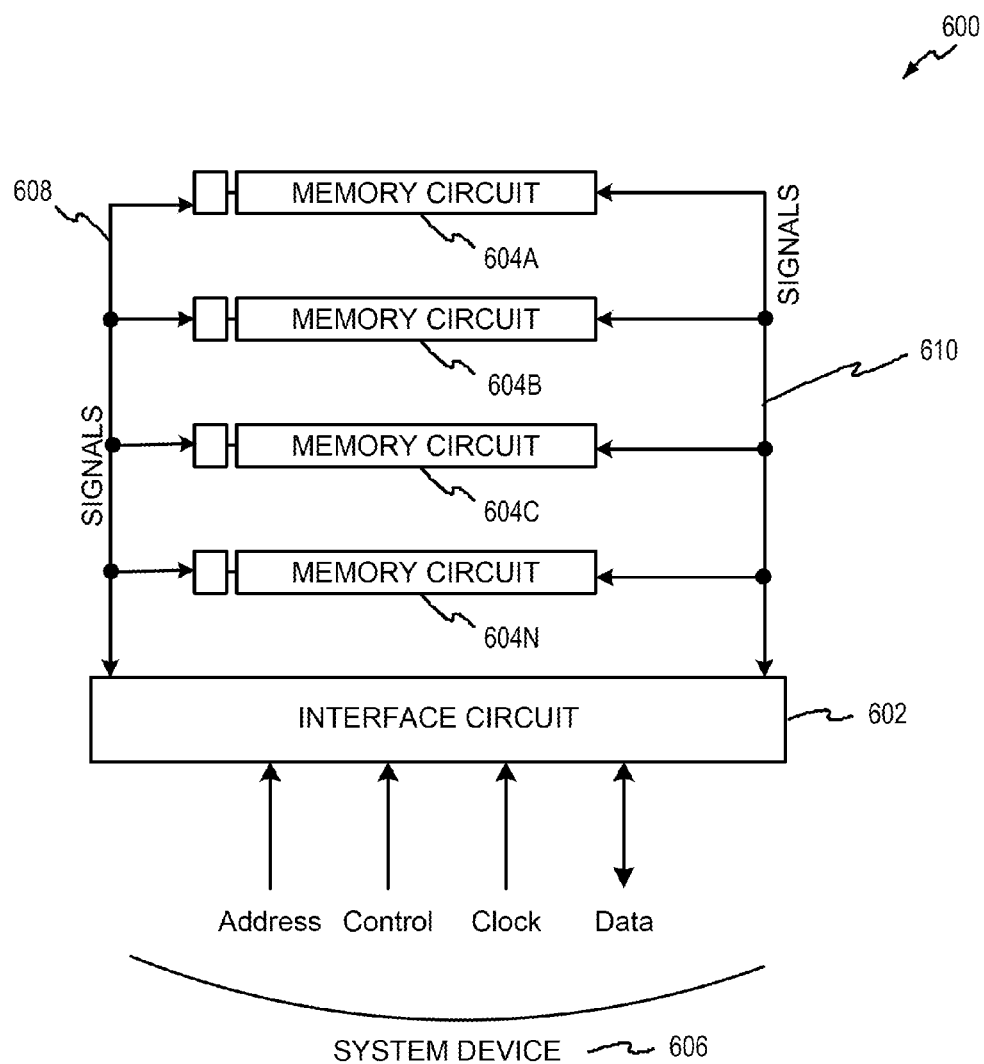
FIG. 6 shows a system including a system device coupled to an interface circuit and a plurality of memory circuits, in accordance with one embodiment.

FIG. 6 shows a system 600 including a system device 606 coupled to an interface circuit 602 and a plurality of memory circuits 604A-604N, in accordance with one embodiment. Although the interface circuit 602 is illustrated as an individual circuit, the interface circuit may also be represented by a plurality of interface circuits, each corresponding to one of the plurality of memory circuits 604A-604N.

In one embodiment, and as exemplified in FIG. 6, the memory circuits 604A-604N may be symmetrical, such that each has the same capacity, type, speed, etc. Of course, in other embodiments, the memory circuits 604A-604N may be asymmetrical. For ease of illustration only, four such memory circuits 604A-604N are shown, but actual embodiments may use any number of memory circuits. As will be discussed below, the memory chips may optionally be coupled to a memory module (not shown), such as a DIMM.

The system device 606 may be any type of system capable of requesting and/or initiating a process that results in an access of the memory circuits. The system may include a memory controller (not shown) through which it accesses the memory circuits 604A-604N.

The interface circuit 602 may also include any circuit or logic capable of directly or indirectly communicating with the memory circuits, such as a memory controller, a buffer chip, advanced memory buffer (AMB) chip, etc. The interface circuit 602 interfaces a plurality of signals 608 between the system device 606 and the memory circuits 604A-604N. Such signals 608 may include, for example, data signals, address signals, control signals, clock signals, and so forth.

In some embodiments, all of the signals communicated between the system device 606 and the memory circuits 604A-604N may be communicated via the interface circuit 602. In other embodiments, some other signals 610 are communicated directly between the system device 606 (or some component thereof, such as a memory controller, or a register, etc.) and the memory circuits 604A-604N, without passing through the interface circuit 602.

As pertains to optimum channel design for a memory system, the presence of a buffer chip between the memory controller and the plurality of memory circuits 604A-604N may present a single smaller capacitive load on a channel as compared with multiple loads that would be presented by the plurality of memory devices in multiple rank DIMM systems, in absence of any buffer chip.

The presence of an interface circuit 602 may facilitate use of an input buffer design that has a lower input threshold requirement than normal memory chips. In other words, the interface circuit 602 is capable of receiving more noisy signals, or higher speed signals from the memory controller side than regular memory chips. Similarly, the presence of the interface circuit 602 may facilitate use of an output buffer design that is capable of not only driving with wider strength range, but also driving with wider range of edge rates, i.e., rise time. Faster edge rate may also facilitate the signal integrity of the data read path, given voltage margin is the main limiting factor. In addition, such an output buffer can be designed to operate more linearly than regular memory device output drivers.

Figure 7:
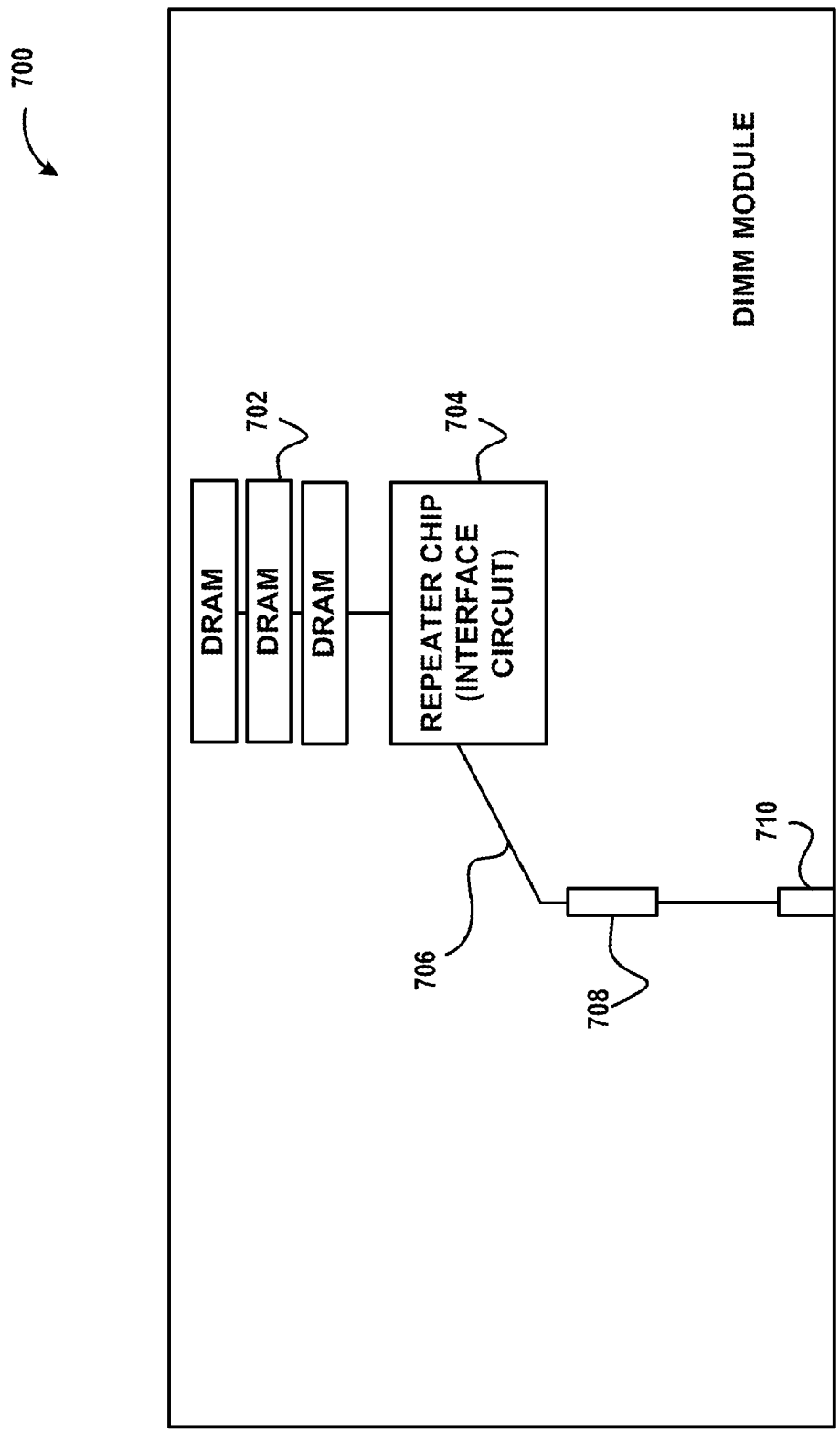
FIG. 7 shows a DIMM, in accordance with one embodiment.

FIG. 7 shows a DIMM 700, in accordance with one embodiment. As shown, the DIMM includes memory (e.g. DRAM) 702, a repeater chip 704 (e.g. an interface circuit), a DIMM PCB 706, a stub resister 708, and a connector finger 710. The repeater chip 704, the DIMM PCB 706, the stub resister 708, and the connector finger 710 may be configured, as described in the context of the details of the above embodiments, in order to provide a high-speed interface between the DRAM 702 and a memory controller (not shown).

Figure 8:
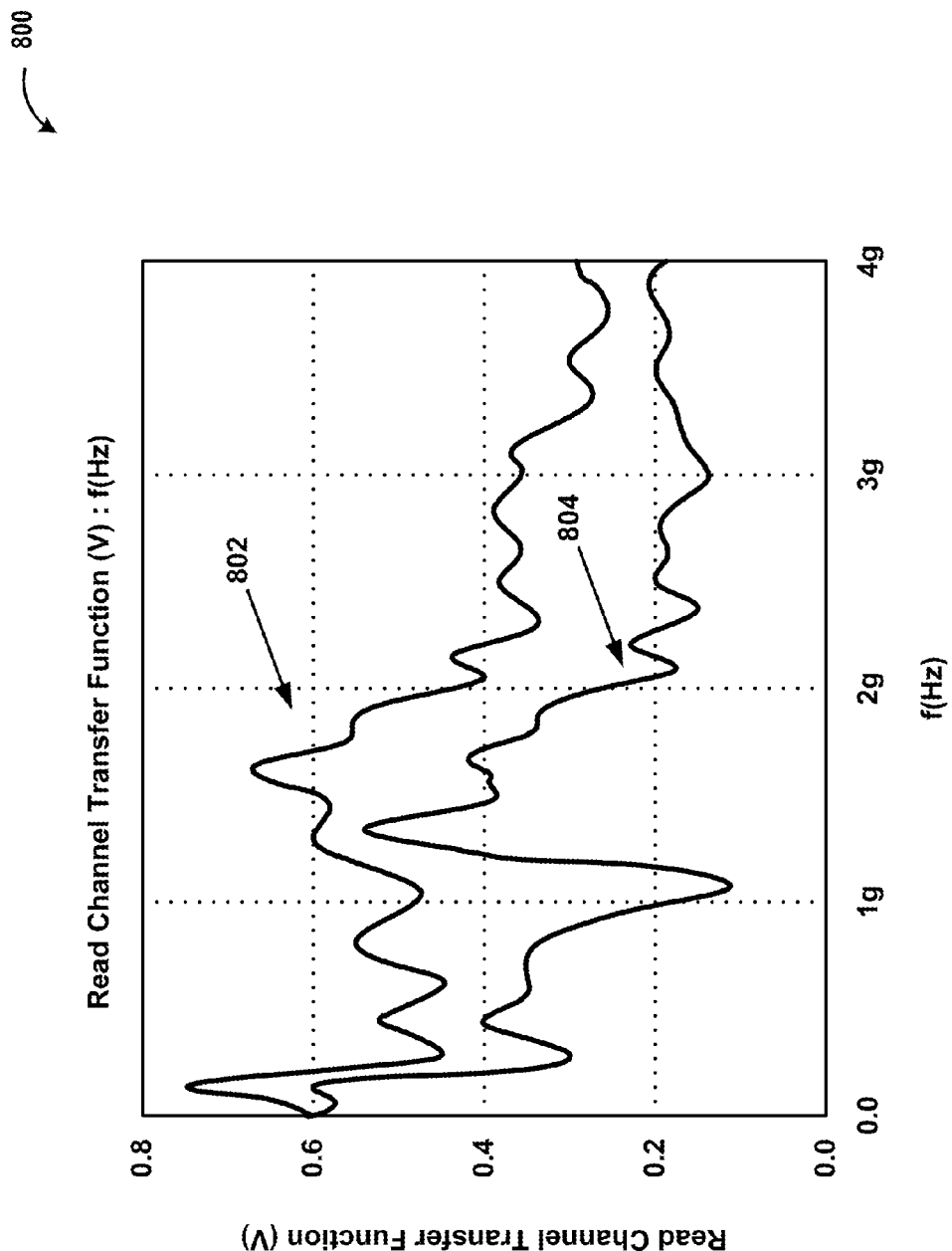
FIG. 8 shows a graph of a transfer function of a read channel, in accordance with one embodiment.

FIG. 8 shows a graph 800 of a transfer function of a read function, in accordance with one embodiment. As shown, a transfer function 802 for the optimized memory channel design indicates significant improvement of channel bandwidth compared to a transfer function 804 of the original channel design on a wide range of frequencies. In this case, the graph 800 represents an experiment with a DDR3, 3 DIMMs per channel topology, using a 1.4 volt power supply voltage on the stimulus source.

While various embodiments have been described above, it should be understood that they have been presented by way of example only, and not limitation. For example, although the foregoing embodiments have been described using a defined number of DIMMs, any number of DIMMs per channel (DPC) or operating frequency of similar memory technologies [Graphics DDR (GDDR), DDR, etc.] may be utilized. Thus, the breadth and scope of a preferred embodiment should not be limited by any of the above-described exemplary embodiments, but should be defined only in accordance with the following claims and their equivalents.

What is claimed is:

1. A system, comprising:
a plurality of memory devices; and
a channel configured to provide electrical communication between a memory controller and a first memory device of the plurality of memory devices, a target impedance of the channel being at least partially achieved using High Density Interconnect (HDI) technology to provide impedance matching between the memory controller and the first memory device;
wherein the channel includes an interface circuit comprising a programmable I/O driver configured to buffer signals from the memory controller, recover signal waveform quality, and resend the signals to the first memory device.

2. The system of claim 1, wherein the channel includes a connection to a plurality of dual in-line memory modules (DIMMs).

3. The system of claim 2, wherein at least one of the DIMMs includes a micro-via.

4. The system of claim 2, wherein at least one of the DIMMs includes a microstrip constructed using HDI technology.

5. The system of claim 2, wherein impedance control is utilized to adjust signal integrity properties of a read path of the plurality of DIMMs, and wherein the impedance control uses HDI technology.

6. The system of claim 2, wherein impedance control is utilized to adjust signal integrity properties of a write path of the plurality of DIMMs, and wherein the impedance control uses HDI technology.

7. The system of claim 1, wherein the interface circuit includes a flip-chip package.

8. The system of claim 1, wherein the memory devices include dynamic random access memory (DRAM).

9. The system of claim 1, wherein impedance matching is substantially the same in both directions of the channel.

10. The system of claim 1, wherein the channel is a read/write channel.

11. The system of claim 10, wherein the matched impedance of the channel in a read direction is substantially equal to the matched impedance of the channel in a write direction.

12. The system of claim 10, wherein using HDI technology includes using thin layers insulating material between conducting layers and drilling micro-via holes to connect conducting layers through the thin insulating layers.

13. A sub-system, comprising:
an interface circuit configured to provide electrical communication between a memory controller and a first memory device of a plurality of memory devices, the interface circuit being further configured to provide impedance matching between the memory controller and the first memory device, the interface circuit comprising a programmable I/O driver configured to buffer signals from the memory controller, recover signal waveform quality, and resend the signals to the first memory device.

14. The sub-system of claim 13, further comprising a channel configured to provide electrical communication between the memory controller and the first memory device, the channel including the interface circuit, wherein impedance matching is substantially the same in both directions of the channel.

15. The sub-system of claim 14, wherein the channel is a read/write channel.

16. The sub-system of claim 15, wherein the matched impedance of the channel in a read direction is substantially equal to the matched impedance of the channel in a write direction.

17. The sub-system of claim 13, wherein the programmable I/O driver is programmable to present a range of drive strengths.

* * * * *

UNITED STATES PATENT AND TRADEMARK OFFICE
CERTIFICATE OF CORRECTION

PATENT NO.        : 8,279,690 B1
APPLICATION NO.   : 13/367259
DATED             : October 2, 2012
INVENTOR(S)       : Min Wang et al.

It is certified that error appears in the above-identified patent and that said Letters Patent is hereby corrected as shown below:

Column 9, Line 6, Claim 12, delete "claim 10," insert --claim 1,--.

Signed and Sealed this
Twenty-sixth Day of February, 2013

Teresa Stanek Rea
*Acting Director of the United States Patent and Trademark Office*